(12) United States Patent
    Vadillo et al.

(10) Patent No.: US 8,283,824 B2
(45) Date of Patent: Oct. 9, 2012

(54) LIQUID DEFLECTING BAFFLE FOR AN ELECTRIC MOTOR

(75) Inventors: Jose L. Vadillo, St. Louis, MO (US); Raymond D. Heilman, Florissant, MO (US); John G. Schrader, St. Louis, MO (US); James D. Ellis, II, Oakland, MO (US); Patrick M. Jones, Kirkwood, MO (US)

(73) Assignee: Nidec Motor Corporation, St. Louis, MO (US)

( * ) Notice: Subject to any disclaimer, the term of this patent is extended or adjusted under 35 U.S.C. 154(b) by 0 days.

(21) Appl. No.: 13/243,407

(22) Filed: Sep. 23, 2011

(65) Prior Publication Data

US 2012/0013212 A1    Jan. 19, 2012

Related U.S. Application Data

(62) Division of application No. 12/266,390, filed on Nov. 6, 2008, now Pat. No. 8,049,385.

(51) Int. Cl.
    *H02K 5/10*    (2006.01)
(52) U.S. Cl. .......................................... 310/89; 310/407
(58) Field of Classification Search .................... 310/54, 310/58, 64, 89, 216.114, 400, 406, 407, 410
    See application file for complete search history.

(56) References Cited

U.S. PATENT DOCUMENTS

| | | | | |
|---|---|---|---|---|
| 4,858,303 A | * | 8/1989 | Fisher | 29/596 |
| 5,268,606 A | * | 12/1993 | Adam et al. | 310/88 |
| 5,998,896 A | * | 12/1999 | Early et al. | 310/89 |
| 6,784,574 B2 | * | 8/2004 | Turner et al. | 310/58 |
| 7,629,720 B2 | * | 12/2009 | Koumura et al. | 310/89 |
| 7,649,289 B2 | * | 1/2010 | Hsu | 310/85 |
| 2005/0093384 A1 | * | 5/2005 | Ishida | 310/88 |
| 2005/0134129 A1 | * | 6/2005 | Sato et al. | 310/88 |
| 2005/0168080 A1 | * | 8/2005 | Simofi-Ilyes et al. | 310/58 |
| 2006/0267432 A1 | * | 11/2006 | Archer et al. | 310/89 |

* cited by examiner

*Primary Examiner* — Quyen Leung
*Assistant Examiner* — Naishadh Desai
(74) *Attorney, Agent, or Firm* — Hovey Williams LLP

(57) ABSTRACT

A fluid deflecting baffle is provided for use on an electric motor to be used in an environment where liquid may otherwise pass through a vent opening in an endshield of the motor. The baffle is secureable to the endshield and extends in a partial covering relationship with the vent opening. The baffle includes a vent passage therethrough and has at least one liquid flow obstructing louver that extends across the vent opening to deflect liquid away from the vent passage while allowing venting air to flow through the vent passage. The louver includes a generally flat liquid deflection surface that is disposed at an oblique angle relative to the axis of the motor and at least partially faces a venting direction of incoming air and fluid.

12 Claims, 7 Drawing Sheets

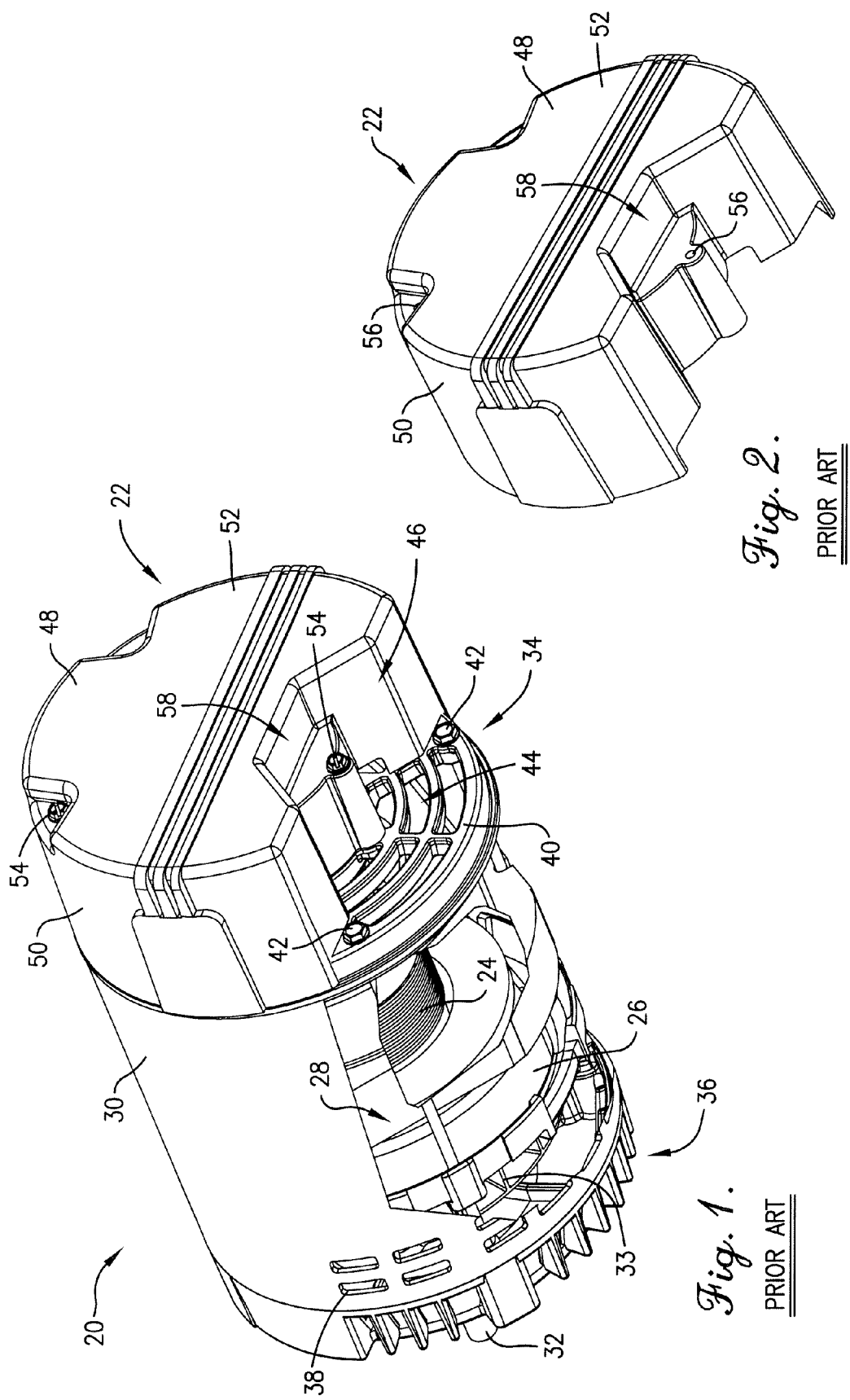

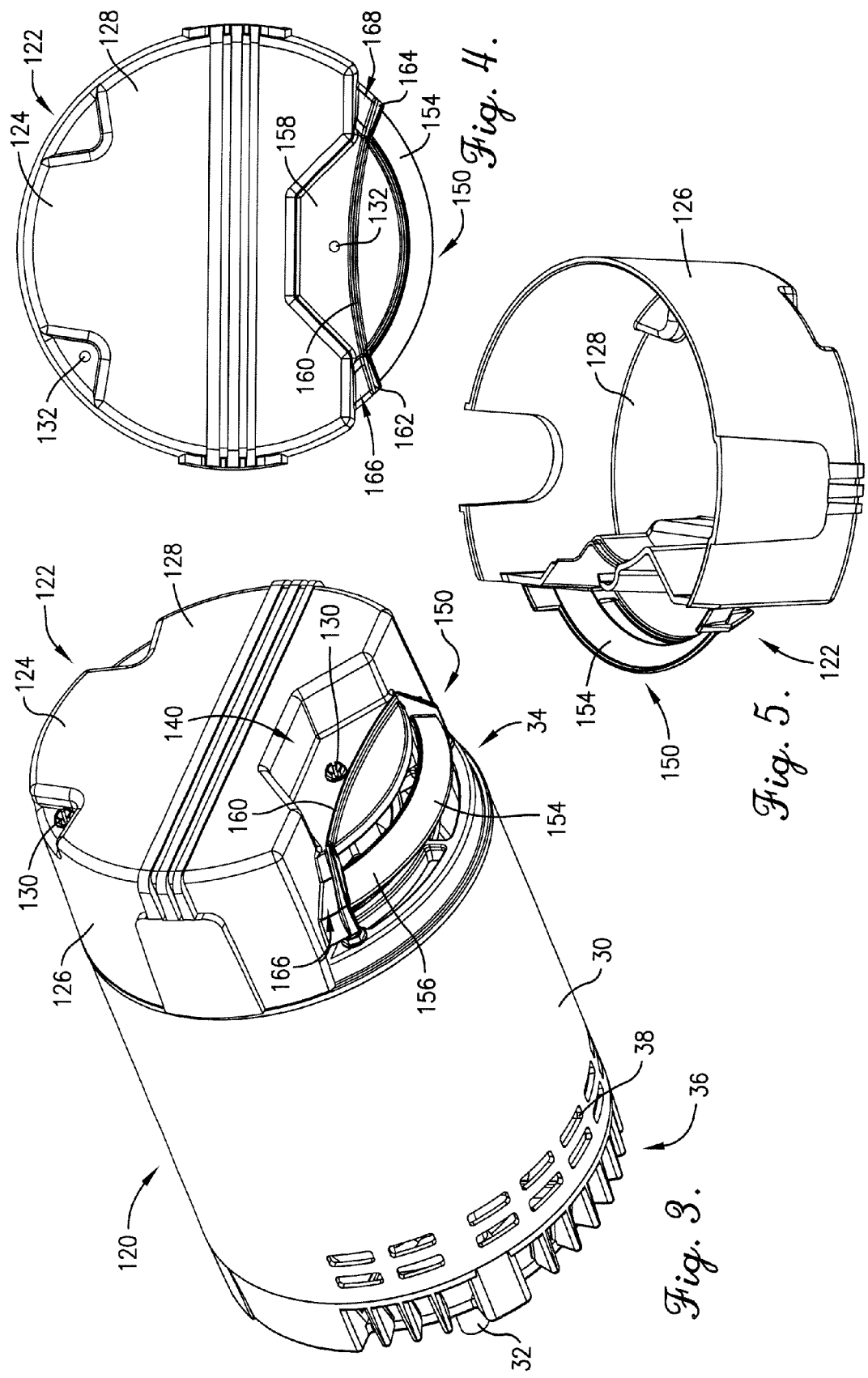

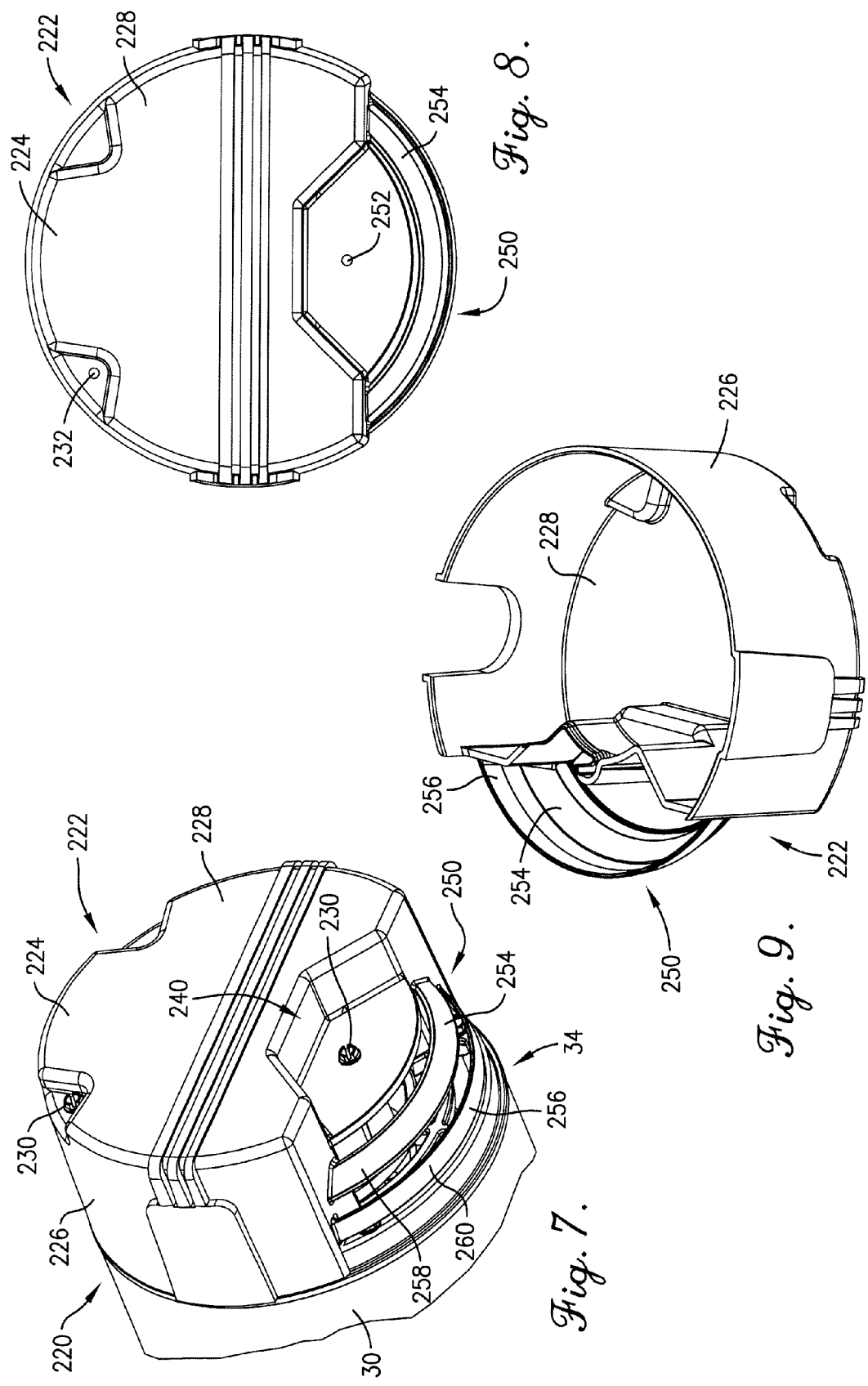

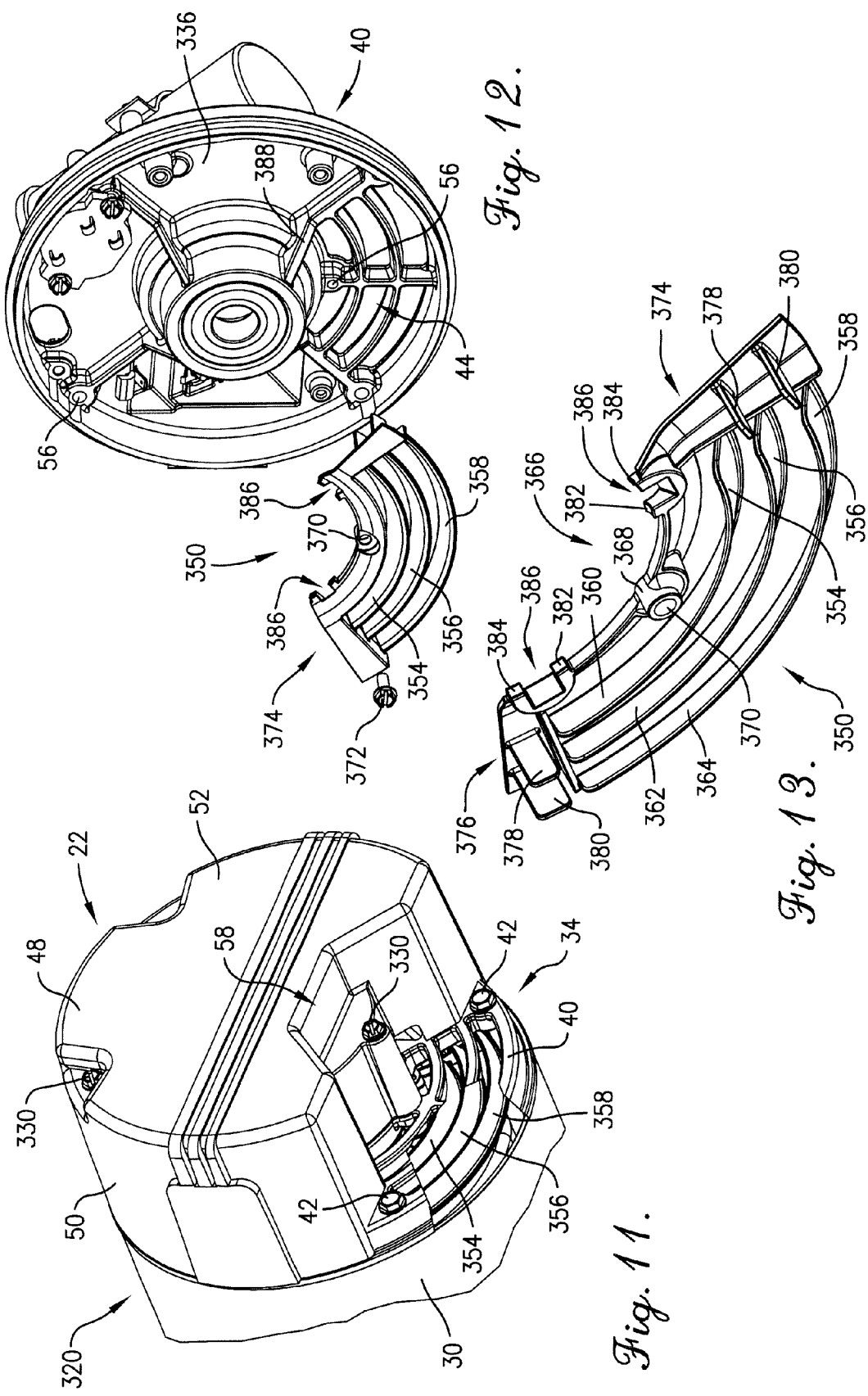

LIQUID DEFLECTING BAFFLE FOR AN ELECTRIC MOTOR

RELATED APPLICATION

This is a divisional of application Ser. No. 12/266,390 filed Nov. 6, 2008, which is hereby incorporated by reference herein.

BACKGROUND OF THE INVENTION

1. Field of the Invention

The present invention relates generally to electric motors having a horizontal axis, such as open drip-proof motors, used in outdoor environments, such as to power a swimming pool pump. More specifically, the present invention concerns a fluid deflecting baffle secureable to an endshield of such a motor that includes a liquid flow obstructing louver with a generally flat liquid deflection surface disposed at an oblique angle relative to the axis of the motor.

2. Discussion of the Prior Art

Those of ordinary skill in the art will appreciate that electric motors need to be protected from outside contaminants in order to function properly. In particular, electric motors that are used in outdoor environments, such as open drip proof motors, need to protect the internal motor components from contaminants (e.g., rain, other liquids, or debris), which could otherwise damage the motor. It is known that continued exposure to contaminants, particularly water or other liquids, can cause corrosion and wear to the internal motor components (e.g., the rotor or stator windings), sometimes leading to a premature failure of the motor. For motors that are used outdoors, exposure to water or other liquids can come not only from vertical rainfall, but also from rain that is blown significantly horizontally, spray from a hose, irrigating sprinklers, and other such sources.

Those of ordinary skill in the art will also appreciate, however, that these electric motors, like many electric devices, generate heat during operation and thus need to be cooled during operation. One effective method as cooling is to use a fan to force a flow of air through the motor in a generally axial venting direction. Consequently, vent openings in the motor case are required, and the case cannot be entirely sealed from outside contaminants. In a horizontal open drip proof motor, intake vent openings are often located in the lower margins of the endshield of the motor case. A typical way to improve convection and increase heat dissipation within the case is to use the fan to increase the velocity of the cooling airflow. Conventionally, one of two methods of using airflow to cool a motor is used, either a pressure fan system (direct mode) or a reverse airflow fan system (RAF).

In the pressure fan system, cooling air is forced from the front of the motor (the side from which the shaft projects) axially through the motor case and out of the back of the motor. Conversely, in the reverse airflow fan system, the blades of the fan are reversed such that air is pulled from the back of the motor axially through the motor case and exhausts at the front of the motor. The reverse airflow fan system creates a more significant vacuum than does the pressure fan system, leading to effective cooling. However, the combination of a stronger vacuum created by a larger pressure differential and the pulling of air from the back of the motor (often more exposed to outside elements) can leave openings on the back intake side of the motor particularly susceptible to water or other liquid entry.

In a traditional reverse airflow fan system, a cover that overhangs the vent opening but is otherwise open below is secured to the endshield on the back of the motor to insulate electrical components and to prevent vertical rainfall from passing through the vent opening. Such prior art covers have been satisfactory in some respects, but these covers also suffer drawbacks as they allow liquids that may flow in a generally axial direction (from sources such as those identified above) to pass through the open area of the cover and directly into the motor case. Once such liquid enters the motor case, the liquid can condense on the internal motor components, detrimentally shortening the effective life of the motor as described above.

The prior art does not include a cover for use in a reverse airflow fan system that accomplishes both effective deflection of axially flowing liquid while also permitting sufficient axial flowing venting air to effectively cool the motor.

SUMMARY

The present invention provides a fluid deflecting baffle for use on a horizontal axis electric motor to be used in an environment where liquid may otherwise pass through a vent opening in the lower margin of an endshield of the motor. The baffle is secureable to the endshield and extends in a partial covering relationship with the vent opening. A baffle secured to the external side of the endshield would preferably become part of a new cover for a typical electric motor, while a baffle secured to the internal side of the endshield would reduce the risk of liquid reaching a center zone of the interior of the motor chamber. In such a situation, liquid would tend to move to the radially outer region of the endshield due to the centripetal forces created by the fan, and travel with a low velocity in small gaps between the stator and the case and exit the chamber through exhaust openings in the case. The baffle includes a vent passage therethrough and has at least one liquid flow obstructing louver that extends across the vent opening to deflect liquid away from the vent passage while allowing venting air to flow through the vent passage and effectively cool the motor. The louver includes a generally flat liquid deflection surface that is disposed at an oblique angle relative to the axis of the motor and at least partially faces a venting direction of incoming air and liquid.

It has been discovered that the louver of this inventive baffle provides significant and effective deflection of fluids that could otherwise enter the motor case unencumbered, while surprisingly allowing sufficient airflow through, such that the temperature difference compared to a baseline cover without a baffle is minimal. The profile of this louvered baffle takes advantage of the ability of the venting air (which has a relatively low density compared to the liquid) to change direction more quickly than any accompanying liquid (which has a relatively high density compared to the venting air). Contact by a mixed fluid with the louvered baffle, then, removes just enough energy from the liquid to leave only the gravitational acceleration component of its trajectory, thus diverting its otherwise axial path into the motor case. This louvered baffle, therefore, provides a unique combination of both effective deflection of axially flowing liquid while also permitting sufficient axial flowing venting air to effectively cool the motor.

According to one aspect of the present invention, an electric motor is provided that includes a rotor rotatable about a horizontal axis, a stator spaced radially from the rotor, and a case defining an internal motor chamber in which the stator and rotor are housed, with the case presenting axial margins. The case includes an endshield adjacent one of said axial margins. The endshield defines a vent opening therethrough so that vent air is permitted to flow in a generally axial venting direction from outside the motor chamber to inside the motor chamber, with the vent opening being disposed below the axis. The electric motor also includes a liquid deflecting baffle that is operably secured to the endshield in a partial covering relationship with the vent opening. The baffle defines a vent passage therethrough to permit air to communicate with the vent opening in the endshield, with the vent passage being disposed below the axis. The baffle includes at least one liquid flow obstructing louver extending across the vent passage to deflect liquid flowing at least partially in the venting direction away from the vent passage. The louver includes a generally flat liquid deflection surface, with the deflection surface being disposed at an oblique angle relative to the axis and at least partially facing the venting direction.

Another aspect of the present invention concerns a liquid deflecting motor protection assembly for at least partially covering a vent opening extending from an external side to an internal side of an endshield of an electric motor, wherein the vent opening is disposed below a horizontal axis of the motor and is configured to permit vent air to flow in a generally axial venting direction from outside the motor to inside the motor, with the assembly being operably secureable to the endshield to define an operational position. The assembly includes an endshield cover operably secureable to the external side of the endshield, with the cover including a body being configured to project axially from the endshield and extend generally radially coextensively with the area of the endshield disposed above the axis when in the operational position, and a liquid deflecting baffle operably secureable to the endshield. The baffle is configured to extend in a partial covering relationship with the vent opening when in the operational position, with the baffle defining a vent passage therethrough. The baffle includes at least one liquid flow obstructing louver extending across the vent passage to deflect liquid flowing at least partially in the venting direction away from the vent passage when in the operational position. The louver includes a generally flat liquid deflection surface, with the deflection surface being disposed at an oblique angle relative to the axis and at least partially facing the venting direction when the baffle is in the operational position.

This summary is provided to introduce a selection of concepts in a simplified form that are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

A preferred embodiment of the present invention is described in detail below with reference to the attached drawing figures, wherein:

FIG. 1 is a partial cutaway, perspective view of an electric motor with an endshield having a vent opening disposed below the axis, and with a prior art endshield cover secured to an external side of the endshield, with portions cutaway to depict elements of the motor;

FIG. 2 is a perspective view of the prior art endshield cover of FIG. 1, depicting in detail an overhanging portion of the body of the cover;

FIG. 3 is a perspective view of an electric motor constructed in accordance with the principles of a preferred embodiment of the present invention, with an endshield cover secured to an external side of the endshield, and depicting a baffle integrally formed with the cover, and the baffle having a liquid flow obstructing louver and a liquid diverting wall;

FIG. 4 is a side elevational view of the cover and integral baffle of FIG. 3, depicting in detail a liquid deflection surface of the louver and the liquid diverting wall;

FIG. 5 is a perspective view of the cover and integral baffle of FIG. 3, shown from the opposite vantage point, depicting in detail a portion of the cover that is secureable to the external side of the endshield, the generally arcuate path of the louver, and an internal surface of the louver;

Figure 10:
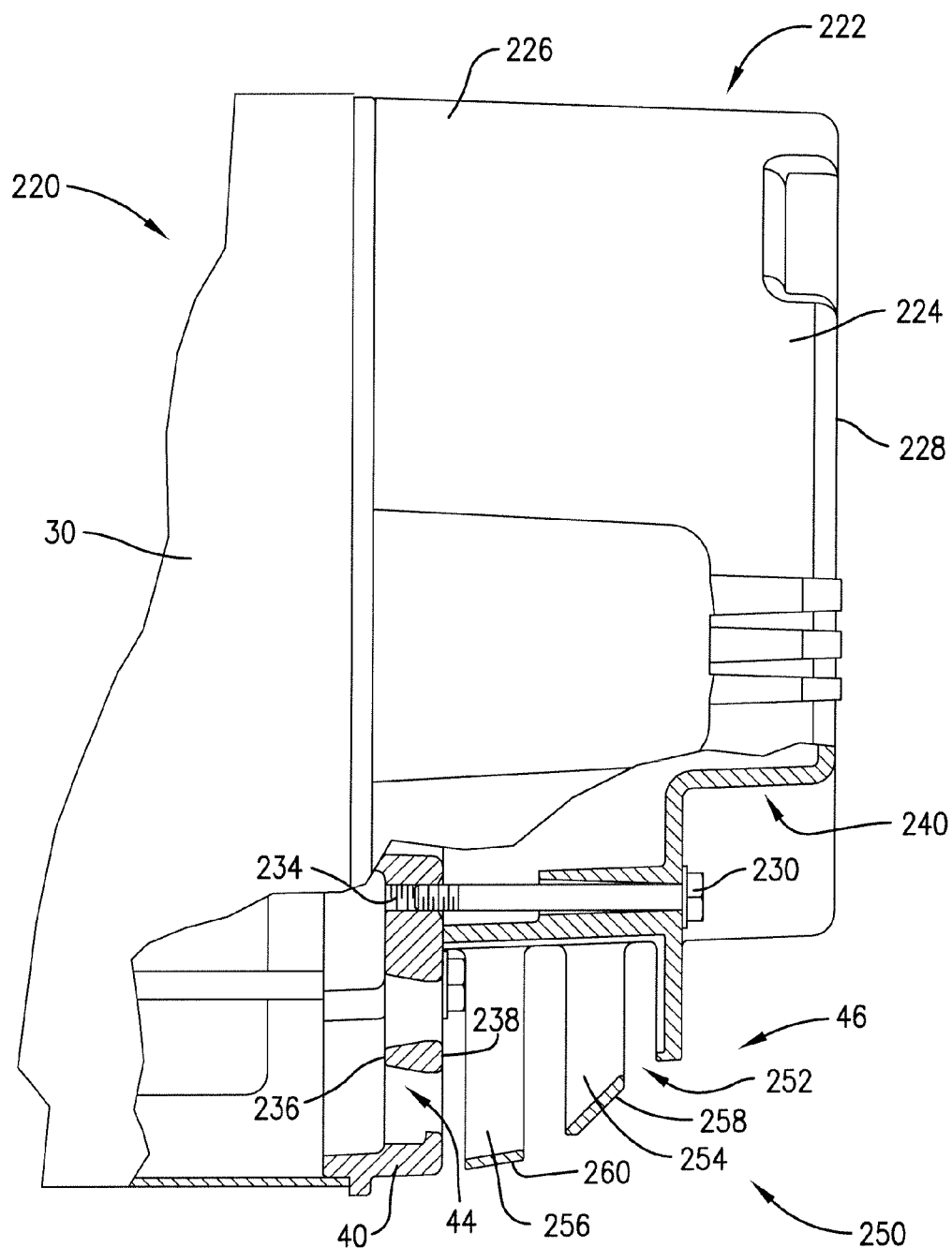
Figure 14:
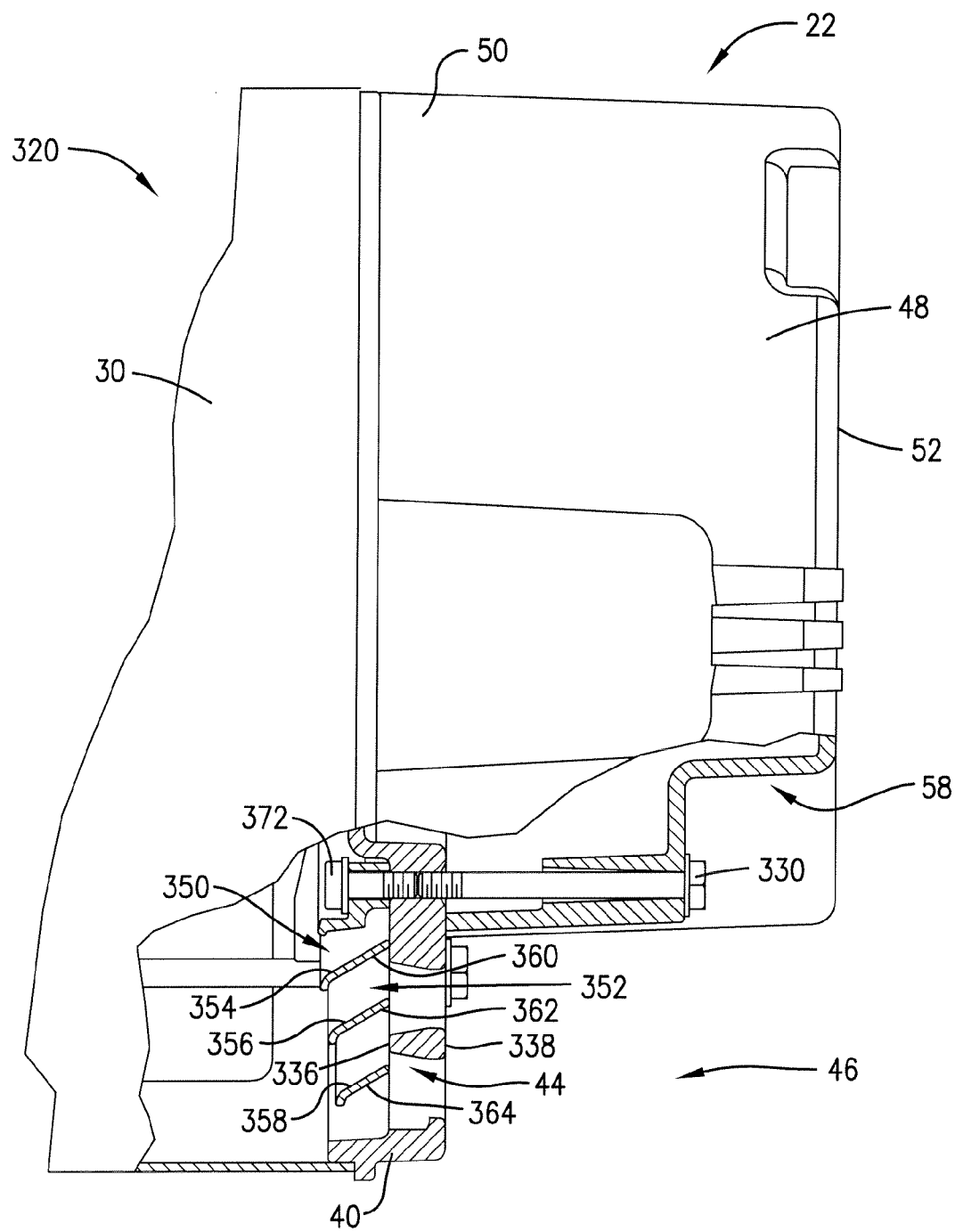

FIG. 7 is a fragmentary, perspective view of another embodiment of an electric motor constructed in accordance with the principles of another embodiment of the present invention and similar in many respects to the motor shown in FIG. 3, with an endshield cover secured to an external side of the endshield, and depicting a baffle integrally formed with the cover, and the baffle having a plurality of liquid flow obstructing louvers;

FIG. 8 is a side elevational view of the cover and integral baffle of FIG. 7, depicting in detail a liquid deflection surface of one of the louvers;

FIG. 9 is a perspective view of the cover and integral baffle of FIG. 7, shown from the opposite vantage point, depicting in detail a portion of the cover that is secureable to the external side of the endshield, the generally arcuate paths of each of the louvers, and internal surfaces of each of the louvers;

FIG. 10 is an enlarged, fragmentary, partial side sectional view of the electric motor of FIG. 7, depicting in detail a portion of the cover and integral baffle including an end wall of the body of the cover, and the oblique angles of each of the deflection surfaces of the baffle;

FIG. 11 is a fragmentary, partial cutaway, perspective view of another embodiment of an electric motor constructed in accordance with the principles of another embodiment of the present invention and similar in many respects to the motor shown in FIG. 3, with an endshield cover secured to an external side of the endshield, and depicting a baffle secured to an internal side of the endshield, with the baffle having a plurality of liquid flow obstructing louvers;

FIG. 12 is an exploded, perspective view of a portion of the electric motor of FIG. 11, depicting in detail the internal side of the endshield and the baffle;

FIG. 13 is an enlarged, perspective view of the baffle of FIG. 12, shown from the opposite vantage point, depicting in detail a side of the baffle that is secureable to the endshield, the generally arcuate paths of each of the louvers, and the liquid deflecting surfaces and internal surfaces of each of the louvers; and FIG. 14 is an enlarged, fragmentary, partial side sectional view of the electric motor of FIG. 11, depicting in detail a portion of the cover, and the oblique angles of each of the deflection surfaces of the baffle secured to the internal side of the endshield.

The drawing figures do not limit the present invention to the specific embodiments disclosed and described herein. The drawings are not necessarily to scale, emphasis instead being placed upon clearly illustrating the principles of the preferred embodiments.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

With initial reference to FIGS. 1 and 2, a prior art electric motor 20 is depicted that includes a conventional cover 22 that allows venting air to pass through, but provides no protection against axially flowing liquids. The motor 20 broadly includes a rotor 24 and a stator 26, with the rotor 24 and the stator 26 both contained within an internal motor chamber 28 defined by a motor case 30. A shaft 32 projects outwardly from the motor 20 in an axial direction and a fan 33 turns with the shaft 32 to pull cooling vent air through the chamber 28 of the motor 20.

The motor case 30 is generally cylindrical and presents an intake side axial margin 34 and an exhaust side axial margin 36. The motor case 30 includes a plurality of exhaust vent openings 38 disposed along a lower margin of the case 30 adjacent the exhaust side axial margin 36. The motor case 30 further includes an endshield 40 adjacent the intake side axial margin 34. In the illustrated embodiment, the endshield 40 is secured to the motor case 30 with a plurality of fasteners comprising bolts 42, although it will be readily appreciated by one of ordinary skill in the art at the endshield 40 could be alternatively secured to the motor case 30, such as by welding, or be integrally formed therewith out departing from the teachings of the present invention.

The endshield 40 defines a vent opening 44 therethrough so that vent air is permitted to flow in a generally axial venting direction 46 from outside to inside the motor chamber 28. As will be readily appreciated by one of ordinary skill in the art upon review of this disclosure, the vent air that flows through the motor 20 in a generally axial venting direction 46 serves to cool the motor 20 from heat generated during operation. In the illustrated embodiment, the vent opening 44 is defined by a grate pattern on the endshield 40.

The conventional cover 22 provides insulating protection for various electrical components of the motor (not shown), and includes a body 48 that presents a radially outer margin 50 and an axially outer margin 52. The conventional cover 22 is secured to the endshield 40 with a plurality of fasteners comprising screws 54 that extend through holes 56 in the body 48 and into corresponding holes (not shown) in the endshield 40. With the conventional cover 22 secured to the end 40 as shown in FIG. 1, the body 48 projects axially from the endshield 40 and extends generally radially coextensively with the area of the endshield 40 disposed above the axis. In this configuration, the body 48 presents an overhanging portion 58 below which the vent opening 44 in the endshield 40 is located.

As will be readily appreciated by one of ordinary skill in the art, when the motor 20 is in its operational position, the conventional cover 22, and particularly the nature of the overhanging portion 58 in relation to the vent opening 44, provides some protection to the interior of the motor chamber 28 against vertically falling rain and the like. As will also be readily appreciated however, the lack of any obstruction in the axial flow direction 46 provides an unencumbered flow path into the motor chamber 28. While vent air can flow along the axial flow direction 46 through this unencumbered flow path and enter the motor chamber 28 for effective cooling, water or other liquids can also flow along the axial flow direction 46 can similarly enter the motor chamber 28. As discussed above, the introduction of contaminating liquids into the motor chamber 28 can have a corrosive effect on internal components of the motor 20, such as a rotor 24 or the stator 26.

With attention now to FIGS. 3-6, an electric motor 120 constructed in accordance with a preferred embodiment of the present invention is depicted that includes a cover 122 that allows venting air to pass through and also provides protection against axially flowing liquids, as described in detail below.

Initially, it is noted that, with the specific exception of the cover 122 and new components described below, many of the elements of the motor 120 are the same as those elements of motor 20 described in detail above. For example, the rotor 24, the stator 26, the motor case 30, the shaft 32 projecting in an axial direction, and the fan 33 are all common to motors 20 and 120. These common elements are numbered the same in FIGS. 3-6 as in FIGS. 1-2 and redundant descriptions will be avoided here. Rather, it is particularly noted that the detailed descriptions of these elements presented above also apply to this embodiment as if presented herein. Reference is specifically made to the detailed description of the motor case 30 and the endshield 40, described in the preceding paragraphs.

The cover 122 includes a body 124 that presents a radially outer margin 126 and an axially outer margin 128. The cover 122 is secured to the endshield 40 with a plurality of fasteners comprising screws 130 that extend through holes 132 in the body 124 and into corresponding holes 134 in the endshield 40. The holes 134 extends through the endshield 40 between an internal side 136 and an external side 138. With the cover 122 secured to the external side 138 of the endshield 40 as shown in FIG. 3, the body 124 projects axially from the endshield 40 and extends generally radially coextensively with the area of the endshield 40 disposed above the axis. In this configuration, the body 124 presents an overhanging portion 140 below which the vent opening 44 in the endshield 40 is located.

The motor 120 further includes a fluid deflecting baffle 150 secured to the external side 138 of the endshield 40 in a partial covering relationship with the vent opening 44. The baffle 150 defines a vent passage 152 therethrough, which permits air to communicate with the vent opening 44 in the endshield 40. With the baffle 150 secured to the endshield 40 as shown in FIG. 3, the vent passage 152 is disposed below the axis.

The baffle 150 includes a liquid flow obstructing louver 154 that extends across the vent passage 152 to deflect liquid flowing at least partially in the axial flow direction 46 away from the vent passage 152. The louver 154 includes a generally flat liquid deflection surface 156, which is disposed at an oblique angle relative to the axis and at least partially faces the axial flow direction 46.

Figure 6:
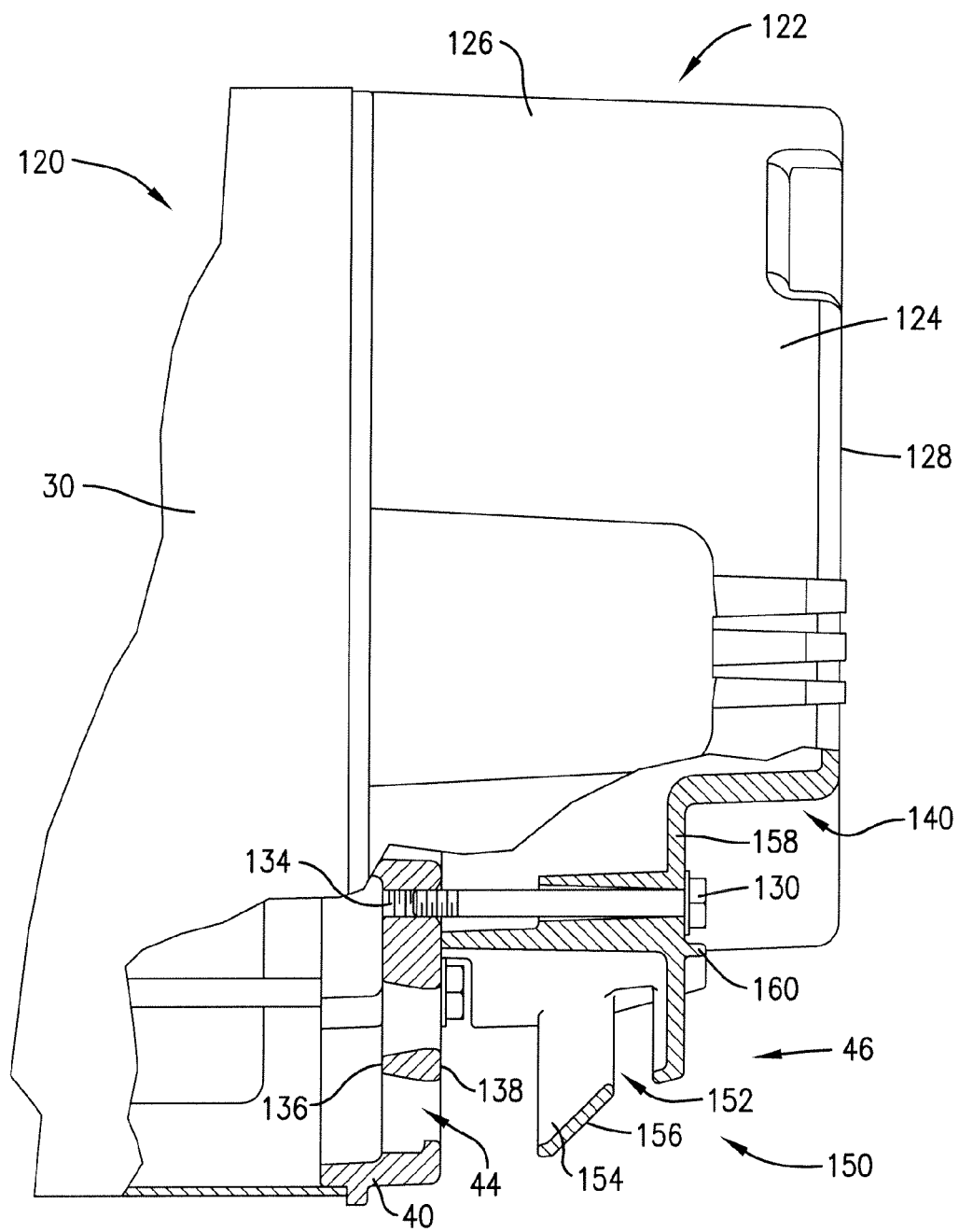
FIG. 6 is an enlarged, fragmentary, partial side sectional view of the electric motor of FIG. 3, depicting in detail a portion of the cover and integral baffle including the end wall of the body of the cover, the liquid diverting wall projecting therefrom, and the oblique angle of the deflection surface of the baffle.

In the illustrated embodiment, the louver 154 extends across the vent passage 152 in a generally arcuate path. More specifically, the arcuate path of the louver 154 illustrated defines a generally circular arc with a center of curvature disposed on the axis of the motor 120. As shown in FIG. 6, the deflection surface 156 of the louver 154 is angled approximately forty-five degrees offset relative to the horizontal axis of the motor 120. As will be readily understood by one of ordinary skill in the art upon review of this disclosure, this particular angle of the deflection surface 156 is by example only, as the deflection surface of an alternative louver may be angled differently, so long as it is oblique, without departing from the teachings of the present invention. It will also be understood that additional louvers could be incorporated into an alternative baffle without departing from the teachings of the present invention. One such alternative baffle is described in detail below with reference to FIGS. 7-10.

It is noted that the angle of the deflection surface 156 of the louver 154 of the preferred embodiment was based on the airflow velocity in the louvered area of the vent passage 152, and was determined by the combination of the particular internal fan 33 used in the motor 120 and the distance between the fan 33 and the vent opening 44 of the endshield 40. The total pressure head created by the internal fan 33 at the location of the louver 154 was considered to be the guiding parameter in sizing both the louver 154 and the virtual cross-sectional area of the vent passage 152 through the baffle 150. As will be readily appreciated by one of ordinary skill in the art, the angle of any louver surface used will enlarge or reduce this virtual cross-sectional area seen by any incoming flow of fluid.

For example, a more aggressively angled louver surface (not shown), such as a louver surface angled more than forty-five degrees offset relative to the horizontal axis of the motor, would increase the available virtual cross-sectional area seen by the incoming fluid, thus providing less restriction against any incoming fluid. Such an aggressively angled louver surface would provide an increased velocity and flow rate of the venting airflow, however the larger available virtual cross-sectional area would detrimentally limit the amount of protection provided against liquid entering the motor 120. Consequently, a balance must be struck between the number of louver surfaces incorporated into a baffle, and the angle of each louver, in order to minimize the airflow losses (minimizing any penalty in convention effectiveness, but providing little blockage of liquid), while still removing enough energy from the liquid to adequately protect the motor. While one preferred embodiment is described herein, alternative louvers designed using specific parameters of other motors are also clearly within the ambit of the present invention.

With continued reference to FIGS. 3-6, the baffle 150 of the illustrated embodiment is integrally formed with the body 124 of the cover 122, with the overhanging portion 140 of the body 124 being disposed above the baffle 150. With the integration of the baffle 150 and the body 124 into a single unit, it is noted that the vent passage 152 in the baffle 150 defines the only opening for airflow through the cover 122 in the axial flow direction 46. Preferably, the baffle 150 and the body 124 of the cover 122 are formed of plastic, although other suitable materials may alternatively be used.

The baffle 150 also includes an end wall 158 that is generally transverse to the axis and generally parallel to the axial margin 128 of the body 124. The end wall 158 is inset relative to the axial margin 128. The baffle 150 further includes an axially projecting liquid diverting wall 160 that is disposed in an overhanging relationship to the vent passage 152, such that any liquid flowing downwardly along the body 124 is diverted away from the vent passage 152. As shown particularly in FIGS. 3 and 4, the liquid diverting wall 160 extends along a generally arcuate path with a center of curvature disposed below the vent passage 152. The liquid diverting wall 160 presents lowermost terminal ends 162, 164, with the vent passage 152 being defined between the terminal ends 162, 164. As shown in FIG. 3, the baffle 150 presents liquid flow channels 166, 168 defined between the liquid diverting wall 160 and the overhanging portion 140 of the body 124 adjacent the terminal ends 162, 164.

It is believed that the presence of the axially projecting liquid diverting wall 160 helps to consolidate any small droplets of liquid that may collect on the body 124 into larger drops of liquid that will fall vertically downward and away from the vent passage 152 due to the force of gravity on the larger drops. This formation of larger drops of fluid prevents the small droplets from passing in front of the vent passage 152 and being undesirably pulled into the motor case 30. It is also noted that an axially projecting portion of the louver 154 could be incorporated to provide similar protection against small droplets of liquid that may condense on the louver 154 from passing in front of the vent passage 152 and being undesirably pulled into the motor case 30. Such an incorporation is clearly contemplated by the scope of the present invention, as will be readily appreciated by one of ordinary skill in the art upon review of this disclosure.

As will be readily appreciated by one of ordinary skill in the art, when the motor 120 is in its operational position, the cover 122 with integral baffle 150 provides protection to the interior of the motor chamber 28, not only against vertically falling rain, but also against any liquids flowing in the axial flow direction 46, as the louver 154 provides an obstruction to such liquid flow. It is noted that the configuration of the louver 154 is such that any air flowing in the axial flow direction 46 will also contact with the liquid deflection surface 156, but will retain sufficient energy to flow around the louver 154 and through the motor chamber 28 for adequate ventilation purposes. It is noted that while multiple embodiments of liquid deflecting baffles are within the ambit of the present invention, some of which are described in detail below, it is believed that the embodiment of the integral baffle 150 described above provides a particularly advantageous synergy of effectively blocking undesirable liquid flow into the motor case 30 while also providing sufficient venting airflow for cooling purposes.

Turning now to FIGS. 7-10, an electric motor 220 constructed in accordance with another embodiment of the present invention is depicted that includes a cover 222 that allows venting air to pass through and also provides protection against axially flowing liquids, as described in detail below.

Initially, it is noted that, with the specific exception of the cover 222 and new components described below, many of the elements of the motor 220 are the same as those elements of motors 20 and 120 described in detail above. For example, the rotor 24, the stator 26, the motor case 30, the shaft 32 projecting in an axial direction, and the fan 33 are all common to motors 20, 120, and 220. These common elements are numbered the same in FIGS. 7-10 as in FIGS. 1-2 and redundant descriptions will be avoided here. Rather, it is particularly noted that the detailed descriptions of these elements presented above also apply to this embodiment as if presented herein. Reference is specifically made to the detailed description of the motor case 30 and the endshield 40, described in the preceding paragraphs.

The cover 222 includes a body 224 that presents a radially outer margin 226 and an axially outer margin 228. The cover 222 is secured to the endshield 40 with a plurality of fasteners comprising screws 230 that extend through holes 232 in the body 224 and into corresponding holes 234 in the endshield 40. The holes 234 extends through the endshield 40 between an internal side 236 and an external side 238. With the cover 222 secured to the external side 238 of the endshield 40 as shown in FIG. 7, the body 224 projects axially from the endshield 40 and extends generally radially coextensively with the area of the endshield 40 disposed above the axis. In this configuration, the body 224 presents an overhanging portion 240 below which the vent opening 44 in the endshield 40 is located.

The motor 220 further includes a fluid deflecting baffle 250 secured to the external side 238 of the endshield 40 in a partial covering relationship with the vent opening 44. The baffle 250 defines a vent passage 252 therethrough, which permits air to communicate with the vent opening 44 in the endshield 40. With the baffle 250 secured to the endshield 40 and shown in FIG. 7, the vent passage 252 is disposed below the axis.

The baffle 250 includes a pair of liquid flow obstructing louvers 254, 256 that each extend across the vent passage 252 to deflect liquid flowing at least partially in the axial flow direction 46 away from the vent passage 252. Each of the louvers 254, 256 includes a generally flat liquid deflection surface 258, 260, which is disposed at an oblique angle relative to the axis and at least partially faces the axial flow direction 46. It is noted that the oblique angles of the pair of louvers 254, 256 are different, although such angles could be the same across both louvers without departing from the teachings of the present invention.

In the illustrated embodiment, each of the louvers 254, 256 extends across the vent passage 252 in a generally arcuate path. More specifically, each of the arcuate paths of the louvers 254, 256 as illustrated defines a generally circular arc with a center of curvature disposed on the axis of the motor 220, such that the arcuate paths are concentric. As shown in FIG. 10, the deflection surface 258 of the louver 254 is angled approximately forty-five degrees offset relative to the horizontal axis of the motor 220, while the deflection surface 260 of the louver 256 is angled approximately ten degrees offset relative to the horizontal axis of the motor 220. As will be readily understood by one of ordinary skill in the art upon review of this disclosure, these particular angles of the deflection surfaces 258, 260 is by example only, as the deflection surfaces of alternative louvers maybe angled differently, so long each is oblique, without departing from the teachings of the present invention.

The baffle 250 of the illustrated embodiment is integrally formed with the body 224 of the cover 222, with the overhanging portion 240 of the body 224 being disposed above the baffle 250. With the integration of the baffle 250 and the body 224 into a single unit, it is noted that the vent passage 252 in the baffle 250 defines the only opening for airflow through the cover 222 in the axial flow direction 46. Preferably, the baffle 250 and the body 224 of the cover 222 are formed of plastic, although other suitable materials may alternatively be used.

As will be readily appreciated by one of ordinary skill in the art, when the motor 220 is in its operational position, the cover 222 with integral baffle 250 provides protection to the interior of the motor chamber 28, not only against vertically falling rain, but also against any liquids flowing in the axial flow direction 46 as the louvers 254, 256 provide obstructions to such liquid flow. It is particularly noted that the relatively shallow angle of the deflection surface 260 may provide particularly effective additional protection against splashing liquids that could otherwise bounce off of the ground and into the motor chamber 28. It is also noted that the configuration of the louvers 254, 256 is such that any air flowing in the axial flow direction 46 will also contact with the liquid deflection surfaces 258, 260, but will retain sufficient energy to flow around the louvers 254, 256 and through the motor chamber 28 for adequate ventilation purposes.

Finally, with attention to FIGS. 11-14, an electric motor 320 constructed in accordance with yet another embodiment of the present invention is depicted that includes the conventional cover 22 that allows venting air to pass through, yet also provides protection against axially flowing liquids, as described in detail below.

Initially, it is noted that, with the specific exception of new components described below, many of the elements of the motor 320 are the same as those elements of motors 20, 120, 220 described in detail above. For example, the rotor 24, the stator 26, the motor case 30, the shaft 32 projecting in an axial direction, and the fan 33 are all common to motors 20, 120, 220, and 320. These common elements are numbered the same in FIGS. 11-14 as in FIGS. 1-2 and redundant descriptions will be avoided here. Rather, it is particularly noted that the detailed descriptions of these elements presented above also apply to this embodiment as if presented herein. Reference is specifically made to the detailed description of the motor case 30 and the endshield 40, described in the preceding paragraphs.

The conventional cover 22 is secured to the endshield 40 with a plurality of fasteners comprising screws 330 that extend through holes 56 in the body 24 and into corresponding holes 334 in the endshield 40. The holes 334 extends through the endshield 40 between an internal side 336 and an external side 338. With the conventional cover 22 secured to the external side 338 of the endshield 40 as shown in FIG. 11, the body 24 projects axially from the endshield 40 and extends generally radially coextensively with the area of the endshield 40 disposed above the axis.

The motor 320 further includes a fluid deflecting baffle 350 secured to the internal side 336 of the endshield 40 in a partial covering relationship with the vent opening 44. The baffle 350 defines a vent passage 352 therethrough, which permits air to communicate with the vent opening 44 in the endshield 40. With the baffle 350 secured to the endshield 40 and shown in FIG. 11, the vent passage 352 is disposed below the axis.

The baffle 350 includes a plurality of three liquid flow obstructing louvers 354, 356, 358 that each extend across the vent passage 352 to deflect liquid flowing at least partially in the axial flow direction 46 away from the vent passage 352. Each of the louvers 354, 356, 358 includes a generally flat liquid deflection surface 360, 362, 364, which is disposed at an oblique angle relative to the axis and at least partially faces the axial flow direction 46. It is noted that the oblique angles of the plurality of louvers 354, 356, 358 are all identical, although such angles could be different across a plurality of louvers without departing from the teachings of the present invention.

The baffle 350 presents a radially innermost margin 366 with an axially projecting boss 368 disposed centrally therealong. A hole 370 is defined axially through the boss 368. The baffle 350 is secured to the internal side 336 of the endshield 40 with a fastener comprising a screw 372 that extends through hole 370 and into the corresponding hole 334 in the endshield 40, although other suitable securement means (e.g., adhesive or integral formation of the baffle with the endshield) may alternatively be used. The baffle 350 further presents radially extending uppermost margins 374, 376, with each margin 374, 376 including a pair of axially outwardly projecting spacers 378, 380 that locate the baffle 350 adjacent to the internal side 336 of the endshield 40. The baffle 350 also includes a pair of radially inwardly projecting fingers 382, 384 disposed along the uppermost ends of the radially innermost margin 366. Each pair of fingers 382, 384 defines a radially outwardly extending recess 386 therebetween. Each recess 386 receives an axially inwardly projecting member 388 of the endshield 40 when the baffle 350 is secured thereto. Preferably, the baffle 350 is formed of plastic, although other suitable materials may alternatively be used.

In the illustrated embodiment, each of the louvers 354, 356, 358 extends across the vent passage 352 in a generally arcuate path. More specifically, each of the arcuate paths of the louvers 354, 356, 358 illustrated defines a generally circular arc with a center of curvature disposed on the axis of the motor 320, such that the arcuate paths are concentric. As shown in FIG. 14, the each deflection surface 360, 362, 364 of the respective louvers 354, 356, 358 is angled approximately thirty degrees offset relative to the horizontal axis of the motor 320. As will be readily understood by one of ordinary skill in the art upon review of this disclosure, these particular angles of the deflection surfaces 360, 362, 364 is by example only, as the deflection surfaces of alternative louvers maybe angled differently so long each is oblique without departing from the teachings of the present invention.

It is noted that the angle of each of the deflection surfaces 360, 362, 364 of the louvers 354, 35, 358 of this embodiment was based on the airflow velocity in the louvered area of the vent passage 352, and was determined by the combination of the particular internal fan 33 used in the motor 320 and the distance between the fan 33 and the vent opening 44 of the endshield 40. These design parameters were used in furtherance of similar goals as those described above, namely to prevent incoming liquid flow from turning into the center of the motor 320 while still allowing the venting airflow to reach the center of the motor 320, where the negative pressure is highest. In the embodiment described herein, the goal of realizing minimal penalty in cooling effect compared to a baseline motor without a deflecting baffle is achieved. It will be readily appreciated by one of ordinary skill in the art, however, that alternative louvers designed using specific parameters of other motors are also clearly within the ambit of the present invention.

The baffle 350 of the illustrated embodiment, unlike the baffles of some previous embodiments, is a separate and distinct piece from the conventional cover 22. The overhanging portion 58 of the body 48 is disposed above the baffle 350 so that the combination of the conventional cover 22 and the baffle 350 provides protection to the interior of the motor chamber 28, not only against vertically falling rain, but also against any liquids flowing in the axial flow direction 46 as the louvers 354, 356, 358 provide obstructions to such liquid flow. It is noted that the configuration of the louvers 354, 356, 358 is such that any air flowing in the axial flow direction 46 will also contact with the liquid deflection surfaces 360, 362, 364, but will retain sufficient energy to flow around the louvers 354, 356, 358 and through the motor chamber 28 for adequate ventilation purposes.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and access the reasonably fair scope of the present invention as pertains to any apparatus not materially departing from but outside the literal scope of the invention set forth in the following claims.

What is claimed is:

1. A fluid deflecting motor protection assembly for at least partially covering a vent opening extending from an external side to an internal side of an endshield of an electric motor, wherein the vent opening is disposed below a horizontal axis of the motor and is configured to permit vent air to flow in a generally axial venting direction from outside the motor to inside the motor, with the assembly being operably securable to the endshield to define an operational position, said assembly comprising:

an endshield cover operably securable to the external side of the endshield, said cover including a body being configured to project axially from the endshield and extend generally radially coextensively with the area of the endshield disposed above the horizontal axis when in the operational position; and a fluid deflecting baffle operably securable to the endshield, said baffle being configured to extend in a partial covering relationship with the vent opening when in the operational position, said baffle defining a vent passage therethrough, said baffle including at least one liquid flow obstructing louver extending across the vent passage to deflect liquid flowing at least partially in the venting direction away from the vent passage when in the operational position, said louver including a generally flat liquid deflection surface, said deflection surface being disposed at an oblique angle relative to the axis and at least partially facing the venting direction when the baffle is in the operational position, said baffle including a plurality of liquid flow obstructing louvers, each of said louvers including a generally flat liquid deflection surface, each of said deflection surfaces being disposed at an oblique angle relative to the axis and at least partially facing the venting direction when the baffle is in the operational position, each of said louvers extending across the vent passage in a generally arcuate path, each of said arcuate paths defining a generally circular arc having a center of curvature disposed on the axis, such that the arcuate paths are concentric when the cover is in the operational position.

2. The assembly as claimed in claim 1, said deflection surface of one of said louvers being angled approximately 45 degrees offset relative to the axis when the cover is in the operational position, said deflection surface of another one of said louvers being angled approximately 10 degrees offset relative to the axis when the cover is in the operational position.

3. The assembly as claimed in claim 1, adjacent ones of said plurality of louvers being approximately equidistantly spaced radially from one another.

4. The assembly as claimed in claim 3, each of said deflection surfaces being angled approximately 30 degrees offset relative to the axis when the baffle is in the operational position.

5. The assembly as claimed in claim 1, said baffle being operably securable to the internal side of the endshield.

6. The assembly as claimed in claim 1, said deflection surface of one of said louvers being angled approximately 45 degrees offset relative to the axis when the baffle is in the operational position.

7. A fluid deflecting motor protection assembly for at least partially covering a vent opening extending from an external side to an internal side of an endshield of an electric motor, wherein the vent opening is disposed below a horizontal axis of the motor and is configured to permit vent air to flow in a generally axial venting direction from outside the motor to inside the motor, with the assembly being operably securable to the endshield to define an operational position, said assembly comprising:

an endshield cover operably securable to the external side of the endshield, said cover including a body being configured to project axially from the endshield and extend generally radially coextensively with the area of the endshield disposed above the horizontal axis when in the operational position; and a fluid deflecting baffle operably securable to the endshield, said baffle being configured to extend in a partial covering relationship with the vent opening when in the operational position, said baffle defining a vent passage therethrough, said baffle including at least one liquid flow obstructing louver extending across the vent passage to deflect liquid flowing at least partially in the venting direction away from the vent passage when in the operational position, said louver including a generally flat liquid deflection surface, said deflection surface being disposed at an oblique angle relative to the axis and at least partially facing the venting direction when the baffle is in the operational position, said baffle being integrally formed with the body of the cover and positioned below the body, said baffle including an axially projecting liquid diverting wall disposed in an overhanging relationship to the vent passage, such that accumulated liquid flowing downwardly is diverted away from the vent passage, said baffle including an end wall that is generally transverse to the axis when the baffle is in the operational position, with the liquid diverting wall projecting from the end wall, said liquid diverting wall extending along a generally arcuate path with a center of curvature disposed below the vent passage, said liquid diverting wall presenting lowermost terminal ends, said vent passage being defined between the terminal ends.

8. The assembly as claimed in claim 7, said louver extending across the vent passage in a generally arcuate path.

9. The assembly as claimed in claim 8, said arcuate path defining a generally circular arc having a center of curvature disposed on the axis when the baffle is in the operational position.

10. The assembly as claimed in claim 7, said deflection surface being angled approximately 45 degrees offset relative to the axis when the baffle is in the operational position.

11. The assembly as claimed in claim 7, said vent passage in the baffle defining the only opening for airflow through the cover in the venting direction when the cover is in the operational position.

12. The assembly as claimed claim 7, said baffle being operably securable to the internal side of the endshield.

* * * * *